United States Patent Office 3,201,427
Patented Aug. 17, 1965

3,201,427
CHLORINE DERIVATIVES OF CYCLOPENTANO-PHENANTHRENE AND PROCESSES FOR THEIR PREPARATION
Piero Gomarasca and Pietro Blasina, Milan, Italy, assignors to Laboratorio Farmaceutico Lofarma Limited Partnership
No Drawing. Filed Feb. 21, 1963, Ser. No. 260,313
Claims priority, application Italy, Mar. 13, 1962, 5,084/62
6 Claims. (Cl. 260—397.4)

This invention relates to new derivatives of cyclopentanophenanthrene and to processes for the preparation thereof. More especially, this invention relates to compounds that can be represented by the following general Formula I:

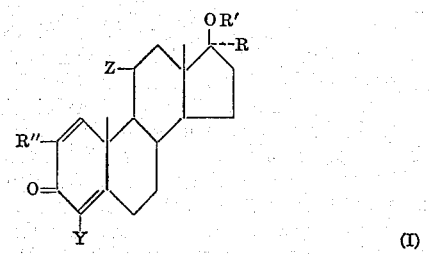

(I)

wherein R represents a lower alkyl group (e.g. a methyl, ethyl or propyl group); R' represents either a H atom or a carboxylic acid radical; R'' represents either a H atom or a lower alkyl group (e.g. a methyl, ethyl or propyl group); Y represents a halogen atom; and Z represents a H atom, a keto group, or a hydroxy group in position α or β—optionally esterified by an acid, such as acetic, propionic, butyric, capronic, enanthic, trimethylacetic, phenoxy-acetic, succinic, cyclopentylpropionic, aminoacetic, benzoic and β-chloropropionic acid.

The compounds that are the object of this invention possess an interesting anabolizing activity and a very favourable anabolic/androgenic ratio. They can be prepared starting from 4,5-dihalogen-compounds (II), which, by means of a further halogenation, are converted into 2,4,5-trihalogen-compounds (III): a molecule of a hydrogen halide is then subtracted from the latter by the use of suitable agents, with the formation of 2,4-dihalogen-derivatives (IV), and from these, the compounds that are the object of this invention are finally obtained by the subtraction of a second molecule of hydrogen halide. The synthesis can be schematically represented as follows:

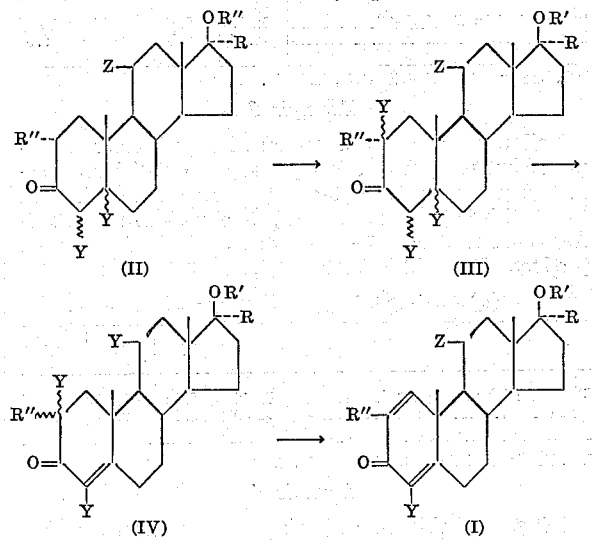

R, R', R'', Y and Z representing here the same atoms or groups of atoms as before.

The halogenation of the compounds (II) can be accomplished by the use of a halogen such as chlorine or bromine; by the use of N-halogen-imides; or even by the use of hypohalogenites (e.g. tert-butyl-hypochlorite). These reactions are preferably carried out in the presence of solvents, such as halogenated hydrocarbons (e.g. carbon tetrachloride), or such as lower carboxylic acids and the N,N-dialkylamides thereof (e.g. acetic acid, dimethylformamide, dimethylacetamide), or even such as dioxane, isopropanol and acetonitrile. Mixtures of these solvents can also be used. The halogenation can be carried out at temperatures ranging from −50 to +50° C. However, it is preferable to operate at temperatures ranging from +5 to +35° C., in the presence of suitable catalysts, such as hydrobromic acid, sulphuric acid, or a sulphonic acid (e.g. protoluenesulphonic acid).

The 2,4,5-trihalogen-derivatives of general Formula III can be converted into 2,4-dihalogen derivatives by the use of substances that have the power of subtracting from the former one molecule of hydrogen halide; anionic resins, used in convenient solvents, such as methanol, acetone and dioxane, or such as pyridine, collidine and dimethylaniline, are suitable for this. The reaction is carried out at a moderate temperature and, as a rule, at lower than 50° C. The elimination of a second molecule of hydrogen halide on the other hand is accomplished at the boiling point, either in the presence of a nitrogen-containing organic base such as collidine, or in the presence of LiCl in dimethylformamide: 2-R''-1,4-diene-4-halogen compounds of Formula I are thus obtained, R'' standing here for the same atoms or groups of atoms that were specified before.

A 2α-R''-4-halogen-3-keto compound (V) can be optionally used as a starting material for the preparation of the products that are the object of this invention. The introduction of a double bond in the position 1,2 of this starting compound can be accomplished either through a reaction with selenium compounds, or through microbiological dehydrogenation.

The reaction can be schematically represented as follows:

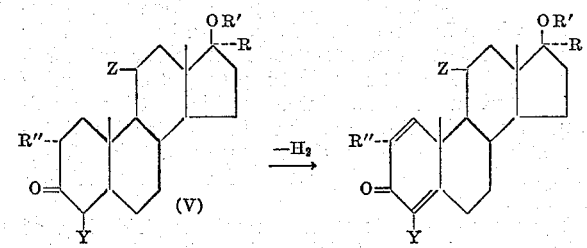

R, R', R'', Y and Z standing here for the same atoms or groups of atoms as before.

Dehydrogenation by the use of selenium compounds can be accomplished employing for instance selenium dioxide or selenious acid.

The compounds are added with a suitable solvent (such as tertiary butyl alcohol or amyl alcohol) and the mixture is boiled under reflux. The reaction is more conveniently carried out in the presence of small amounts of acetic acid or pyridine, while the reaction yields are more favourable when operating in the presence of certain metals of the second or eighth group of the Periodic System.

Microorganisms such as *Corynebacterium simplex*, *Bacillus sphaericus* and *Didymella lycopersici* have been taken into consideration for the microbiological dehydrogenation.

In order to bring about these fermentations, the steroid is dissolved in an alcohol such as methanol or ethanol, and the obtained solution is added to a suitable culture of the microorganism. The culture media employed for this purpose are those containing sugars (such as dextrose or lactose), peptones, wheat extract, soybean products and the like, mineral salts or nutrient synthetical solutions.

The fermentations are carried out under aerobic conditions, the culture being either stirred or submerged, with stirring and aeration. The isolation of the products of this process can be accomplished for instance by extraction with an organic solvent such as e.g. chloroform, methylene chloride, or ethyl acetate.

The compounds that are the object of this invention can also be prepared starting from a $2R''-\Delta^{1,4}$-3-oxo derivative (VI), dissolving the latter in a suitable solvent (such as dimethylformamide, carbon tetrachloride, dioxane, ether, pyridine or another organic nitrogen base) and reacting it with the selected halogen. Before being added, the halogen may be dissolved in a suitable solvent, for instance in a carboxylic acid (e.g. acetic, propionic or butyric acid), or in an inert solvent (e.g. carbon tetrachloride or dioxane), but it may as well be added directly, without being previously dissolved.

The reaction can be represented as follows:

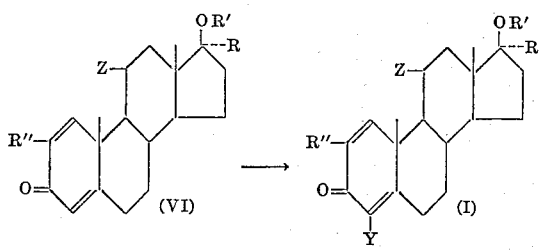

R, R′, R″, Y and Z representing here the same atoms or groups of atoms as specified before.

The following examples, which further elucidate this invention, are not meant to limit the scope thereof as defined in the appended claims.

*Example 1*

7.5 g. of 4,5-dichloro - 11 - alpha hydroxy - 17 alpha-methyltestosterone (M.P.=178–179°, $(\alpha)_D=-44°$) are dissolved in 100 cc. of glacial acetic acid, and to the resulting solution is added a solution of 97 cc. of bromine in acetic acid (0.2 molar soln.), this addition being completed within 2 minutes and the solution being thereafter kept under stirring at room temperature for another 3 minutes. The reaction product is precipitated by pouring the mixture into 500 cc. of water and ice. It is then collected by suction filtration, washed free of acid, and dissolved in methylene chloride, and the methylene chloride solution is washed with water and dried over sodium sulphate.

Upon vacuum-evaporation, the solvent yields 8 g. of 2-bromo-4,5-dichloro-11-alpha-hydroxy-17-alpha - methyl testosterone, and this is recrystallized from acetone.

1 g. of 2-bromo-4,5-dichloro-11-alpha - hydroxy - 17-alpha-methyl-testosterone is dissolved in 5 cc. of pyridine and the solution is allowed to stand at room temperature for 2 hours. It is then poured into a mixture of water, ice and hydrochloric acid. The reaction product precipitates out: it is collected by suction filtration, washed with water until free from acid, and dissolved in methylene chloride. The methylene chloride solution is washed again with water and dried over sodium sulphate.

The reaction product (2 - bromo - 4-chloro-11-alpha-hydroxy - 17 - alpha-methyltestosterone), recrystallized from acetone-petroleum ether, has M.P.=95–98°, shows an ultraviolet max at 262 m$\mu$ and $(\alpha)_D=+2°$.

0.5 g. of 2-bromo-4-chloro-11$\alpha$-hydroxy-17$\alpha$ - methyl-testosterone are dissolved in 5 cc. of collidine, the solution is warmed to the boiling point and kept at this temperature under a steady flow of nitrogen for 45 minutes. After cooling, methylene chloride is added, the solution is washed with water, with 5% hydrochloric acid, again with water, and finally dried over sodium sulphate.

Upon vacuum-evaporation the solvent yields 0.35 g. of 4-chloro-17$\alpha$-methyl-$\Delta^{1,4}$-androstadiene-11$\alpha$-17$\beta$ - diol - 3-one which, after recrystallization from acetone-petroleum ether, has M.P.=225–226°, $\lambda_{max}$ 253–254, - $\epsilon$=13,000, $(\alpha)_D=+30$ (1% CHCl$_3$).

|  | C | H | O | Cl |
|---|---|---|---|---|
| Theoretical for C$_{20}$H$_{27}$O$_3$Cl | 68.46 | 7.76 | 13.68 | 10.10 |
| Found | 68.61 | 7.67 | 13.81 | 9.88 |

I.R. bands (Nujol): 6.05, 6.14, 6.32, 12.05.

*Example 2*

19 g. of 4,5-dichloro-2$\alpha$,17$\alpha$-dimethyltestosterone are dissolved in 150 cc. of glacial acetic acid. To the resulting solution is added 150 cc. of a 0.25 mol solution of bromine in acetic acid, this addition being completed within 2 minutes. Upon stirring for an additional 2 minutes the solution loses its colour; it is then poured into 1000 g. of a mixture of water and ice. The reaction product precipitates: it is collected by filtration, washed with water, dissolved in methylene chloride and again washed with water. The methylene chloride extracts are dried over sodium sulphate and the solvent is then evaporated to dryness under vacuum. Without purifying the obtained product (18.1 g.), 90 cc. of anhydrous pyridine are added to it, and the obtained solution is allowed to stand 2 hours at room temperature. It is then poured into a mixture of ice and water, and the solid product is collected by suction filtration.

The product is dissolved in methylene chloride, it is washed with water, with dilute hydrochloric acid, again with water, and the solution is then evaporated to dryness under vacuum. 55 cc. of newly distilled collidine are added to the perfectly dry product, and the obtained solution is refluxed in a nitrogen atmosphere for 45 minutes. Methylene chloride is then added, the collidine is eliminated by repeatedly shaking with dilute hydrochloric acid, the solution is dried over sodium sulphate and the solvent is evaporated to dryness under vacuum. The product does not crystallize; it is chromatographed through 600 g. of aluminium oxide (activity III) and recovered from the benzene-petroleum ether (7:3) eluates. Upon recrystallization from acetone-petroleum ether 2.1 g. of 4-chloro-2,17$\alpha$-dimethyl-$\Delta^{1,4}$-androstadiene-17$\beta$-ol-3-one, are obtained. The product has M.P.=190–192° C., $\lambda_{max}$ 254 m$\mu$, $\epsilon$=13.600, $(\alpha)_D=+52°$ C.

|  | C | H | O | Cl |
|---|---|---|---|---|
| Theoretical for C$_{21}$H$_{29}$O$_2$Cl | 72.29 | 8.38 | 9.17 | 10.16 |
| Found | 72.17 | 8.16 | 9.39 | 9.83 |

I.R. bands: 6.05, 6.14, 6.29, 11.77, 12.40, 13.

*Example 3*

Following the same procedure described under Example 1, but using as a starting material 4,5-dichloro-17$\alpha$-methylandrostane-17$\beta$-ol-3-one (prepared as described in the British Patent No. 792,727) 4-chloro - 17$\alpha$ - methyl-$\Delta^{1,4}$-androstadiene-17$\beta$ - ol -3- one is obtained as a final product. It has M.P.=125–127°, $(\alpha)_D=+45°$, $\lambda_{max}=245$ m$\mu$, $\epsilon=12,400$

|  | C | H | O | Cl |
|---|---|---|---|---|
| Theoretical for C$_{20}$H$_{27}$O$_2$Cl | 71.72 | 8.12 | 9.55 | 10.58 |
| Found | 71.50 | 8.16 | 9.73 | 10.38 |

I.R. bands (Nujol): 6.03, 6.13, 6.32, 11.95.

*Example 4*

0.1 g. of 4-chloro-2$\alpha$,17$\alpha$-dimethyltestosterone, having M.P. 187–189°, $(\alpha)_D=+90°$, $\lambda_{max}$ 254m$\mu$, $\epsilon=12.500$ is dissolved in methanol and the resulting solution is added to flasks containing a 24-hour culture of *Corynebacterium simplex* in a nutrient medium consisting of a 0.1% Difco yeast extract buffered at a pH of 6.5. The mixture is stirred at a temperature of 28° C. for 6 hours, the resulting broth is extracted with chloroform, and the chloroform extract is washed with water.

After standing over sodium sulphate, the chloroform is vacuum-evaporated.

The residue is chromatographed through aluminium oxide (activity III): 4-chloro-2,17α-dimethyl-$\Delta^{1,4}$-androstadien-17β-ol-3-one is obtained by elution with benzene. The product is identical with the one obtained according to the process described under Example 2.

Example 5

25 cc. of a 4-day culture of *Didymella lycopersici* are added to a nutrient medium consisting of 0.5 g. of primary potassium orthophosphate, 0.2 g. of magnesium sulphate heptahydrate, 0.25 g. of potassium chloride, 0.8 g. of sodium nitrate, 20 g. of dextrose and 0.5 g. of Difco years extract, dissolved in 500 cc. of water, adjusted to pH 5.5 by the addition of sodium hydroxide, and sterilized.

The resulting culture is stirred for 48 hours at a temperature of 28° C. To the well developed culture is added 250 mg. of 4Cl-17α-methyltestosterone (prepared according to the process described in the British Patent No. 792.727) dissolved in 5 cc. of methanol under conditions of sterility. The mixture is stirred for 40 hours at a temperature of 28° C. The mycelium is then separated by suction filtration, washed with water and ethyl acetate, and the combined filtrates are extracted with ethyl acetate.

The ethyl acetate solutions are washed with water, dried and vacuum evaporated. The residue is recrystallized, and 4-chloro-17α-methyl-$\Delta^{1,4}$-androstadiene-17β-ol-3-one, having M.P.=125–127° C. is thus obtained. This product does not have a lower melting point than that of the product obtained as specified under Example 3. The I.R. spectra are identical.

Example 6

A solution of 1 g. of 4-chloro-2-alpha,17-alpha-dimethyl-$\Delta^4$-androsten-17β-ol-3-one in 60 cc. of tertiary butyl alcohol is added with 1.35 g. of selenium dioxide and 0.2 cc. of pyridine, and the resulting solution is refluxed in a nitrogen atmosphere for 48 hours. Another 1.35 g. of selenium dioxide is then added and the mixture is kept under reflux for 48 more hours. The cooled solution is then filtered through celite, is added with ethyl acetate and subsequently washed with ammonium sulphide, 5% sodium carbonate, water, dilute hydrochloric acid, and again water (in that order). Thereafter, the solution is dried over sodium sulphate and the solvent is vacuum-distilled. The obtained crude product is chromatographed through $Al_2O_3$ of activity III. 4-chloro-2,17α-dimethyl-$\Delta^{1,4}$-androstadiene-17β-ol - 3 - one is recovered from the benzene-petroleum ether (7:3) eluates; after recrystallization from acetone-petroleum ether the product proves to be identical to the one prepared as specified under Examples 2 and 4.

Example 7

To a solution of 2 g. of 4-chloro-17α methyl-$\Delta^4$-androsten-11α,17β-diol-3-one in 120 cc. of tertiary amyl alcohol is added 3.5 g. of selenium dioxide and 0.9 cc. of glacial acetic acid, and the resulting mixture is refluxed in a nitrogen atmosphere for 36 hours. Another 2.5 g. of selenium dioxide is then added and refluxing is protracted for a further 48-hour period. The solution is then cooled, filtered through celite, ethyl acetate is added and shaken with sodium carbonate, metabisulphite, water, dilute hydrochloric acid, and again water in that order. Thereafter, it is dried over sodium sulphate and the solvent is removed under vacuum. The product is chromatographed on neutral aluminium oxide, and 4 - chloro - 17 methyl - $\Delta^{1,4}$androstadiene - 11α, 17β-diol-3-one is recovered from the benzene fractions. The final product is identical with the one obtained according to the process described under Example 1.

Example 8

1.5 g. of 17α-methyl-$\Delta^{1,4}$-androstadien-17β-ol-3-one (prepared as described by Meystre & C., Helv. XXXIX (1956) 741) are dissolved in 20 cc. of dimethylformamide, the solution is cooled to —20° C. and 4.55 cc. of a 1.21 mol solution of chlorine in propionic acid are added.

The solution is allowed to stand for 5 hours at a temperature of —10° C., and is then poured into a mixture of water and ice. The reaction product is collected by filtration and dissolved in ethyl ether; the ether extracts are washed with water, dried over sodium sulphate and brought to dryness under vacuum.

The product is chromatographed on aluminium oxide, recovered from the benzene eluates, and recrystallized from acetone-hexane. It has M.P.=125–127° C., $$(\alpha)_D = +45°, \lambda_{max}\ 246, \epsilon = 12.400$$

The I.R. spectrum is identical with the one shown by the product prepared as described under Examples 3 and 5.

Example 9

3.02 g. of 2,17α-dimethyl-$\Delta^{1,4}$-androstadien-17β-ol-3-one (prepared as described by R. Mauli, H. J. Ringold and C. Djerassi, J.A.C.S. 82: 5498, 1960) are dissolved in 180 cc. of carbon tetrachloride and to the resulting solution is added 10 cc. of a 1.0 mol solution of $Cl_2$ in actic acid. The solution is kept in the dark for 5 hours at a temperature ranging from —10 to —8° C., and the product is then poured into a mixture of water and ice. Methylene chloride is added and the extract is washed with water. After drying over sodium sulphate, the solvent is vacuum-distilled.

The crude product obtained is chromatographed on neutral aluminium oxide, recovered from the benzene-petroleum ether (7:3) fractions, and recrystallized from acetone-petroleum ether. The resulting product is identical with the product prepared as specified under Examples 2 and 6.

Example 10

3.3 g. of 2,17α-dimethyl-$\Delta^{1,4}$androstadiene-17β-ol-3,11-dione are dissolved in 76 cc. of dimethylformamide and to the resulting solution is added, at a temperature of —10°, 14.3 cc. of 0.77 mol solution of chlorine in propionic acid. The solution is kept at the temperature of —10° C. for 5 hours, poured into a mixture of water and ice, and the white precipitate that forms is dissolved in methylene chloride, washed with water and dried over sodium sulphate. Thereafter the solvent is removed by vacuum-distillation and the residue is chromatographed on aluminium oxide. 4-chloro-2,17α-dimethyl - $\Delta^{1,4}$ - androstadiene - 17β - ol - 3,11 - dione is recovered from the benzene-ethyl ether (9:1) fractions. It has M.P.=189–191°, $\lambda_{max}$ 250 m$\mu$, $\epsilon$=13.800, I.R. bands: 5.85, 6.03, 6.11, 6.26 (Nujol).

Example 11

1.45 g. of 2,17α-dimethyl-$\Delta^{1,4}$-androstadiene-11α,17β-diol-3-one 11 acetate are dissolved in 34 cc. of dimethylformamide, the resulting solution is cooled to —10° and to it is added, at this temperature, 5.58 cc. of a 0.77 mol solution of chlorine in propionic acid. After 5 hours the solution is poured into a mixture of ice and water. The white precipitate that forms is collected by filtration, dissolved in methylene chloride, washed with water and dried over sodium sulphate. The solvent is then removed by vacuum-distillation and the product is chromatographed on neutral aluminium oxide. 4-chloro-2, 17α - dimethyl - $\Delta^{1,4}$-androstadiene - 11α,17β - diol - 3-one-11-acetate is recovered from the benzene-ethyl ether (93:7) fractions. It has M.P.=184–186°, $\lambda_{max}$ 254mμ, $\epsilon$=15.600, $(\alpha)_D$=+9°.

|   | C | H | O | Cl |
|---|---|---|---|---|
| Theoretical for $C_{23}H_{31}O_4Cl$ | 67.88 | 7.68 | 15.73 | 8.71 |
| Found | 67.44 | 7.57 | 16.03 | 9.05 |

I.R. bands: 5.84, 6.02, 6.08, 6.25, 11.76, 13.07 (Nujol).

It must be understood that this invention is not bound to the details of the processes particularly described, and includes modifications thereof within the scope of the appended claims.

What we claim is:
1. Compounds of the formula:

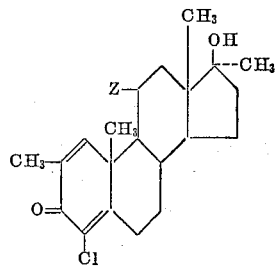

wherein Z is selected from the group consisting of oxygen, hydrogen, hydroxy and acetate.
2. 4 - chloro - 2,17α - dimethyl - $\Delta^{1,4}$ - androstadien-17β-ol-3-one.
3. 4 - chloro - 2,17α - dimethyl - $\Delta^{1,4}$ - androstadien-17β-ol-3,11-dione.
4. 4 - chloro - 2,17α - dimethyl - $\Delta^{1,4}$ - androstadien-11α,17β-diol-3-one.
5. 4 - chloro - 2,17α - dimethyl - $\Delta^{1,4}$ - androstadien-11β,17β-diol-3-one.
6. 4 - chloro - 2,17α - dimethyl - $\Delta^{1,4}$ - androstadien-11α,17β-diol-3-one-11-acetate.

References Cited by the Examiner

UNITED STATES PATENTS 2,900,398  8/59  Wettstein et al. _____ 260—397.4
2,981,659  4/61  Fonken et al. _____ 195—51

FOREIGN PATENTS 792,727  4/58  Great Britain.

OTHER REFERENCES

Beereboom et al.: J.A.C.S. 75, pp. 3500–05 (1953).

LEWIS GOTTS, *Primary Examiner.*